July 9, 1929.　　F. C. FISHER　　1,719,836
AIR DISPENSING DEVICE
Filed July 16, 1927　　3 Sheets-Sheet 1
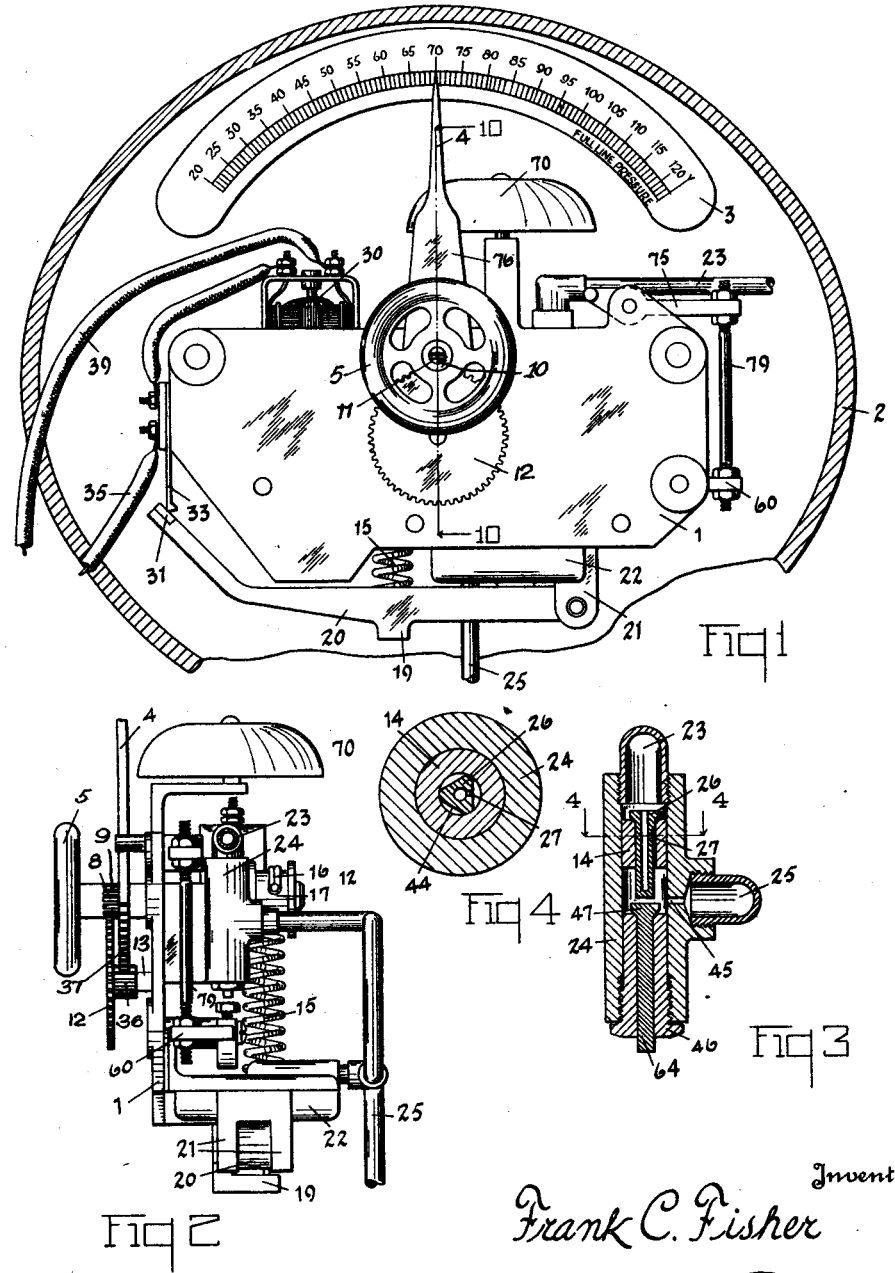

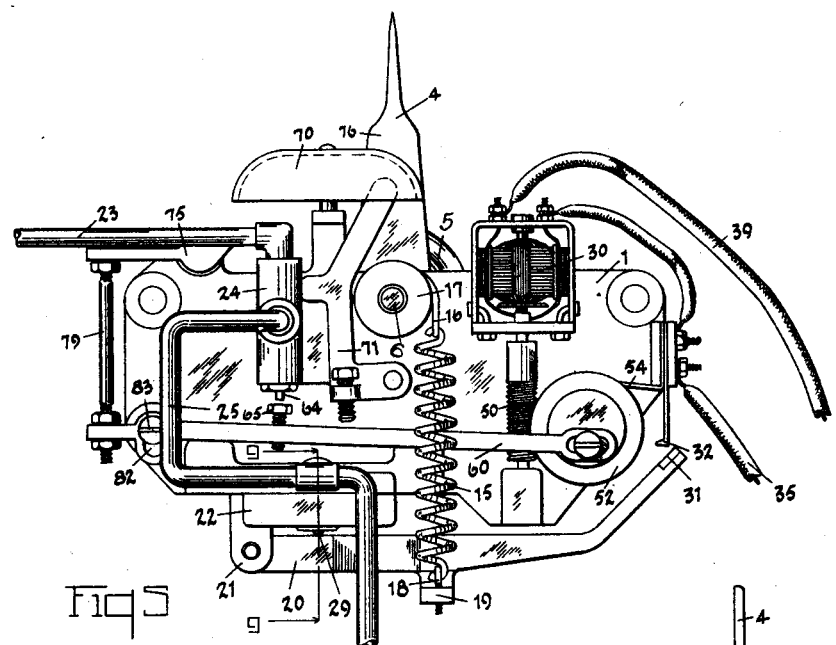

July 9, 1929.  F. C. FISHER  1,719,836
AIR DISPENSING DEVICE
Filed July 16, 1927   3 Sheets-Sheet 3
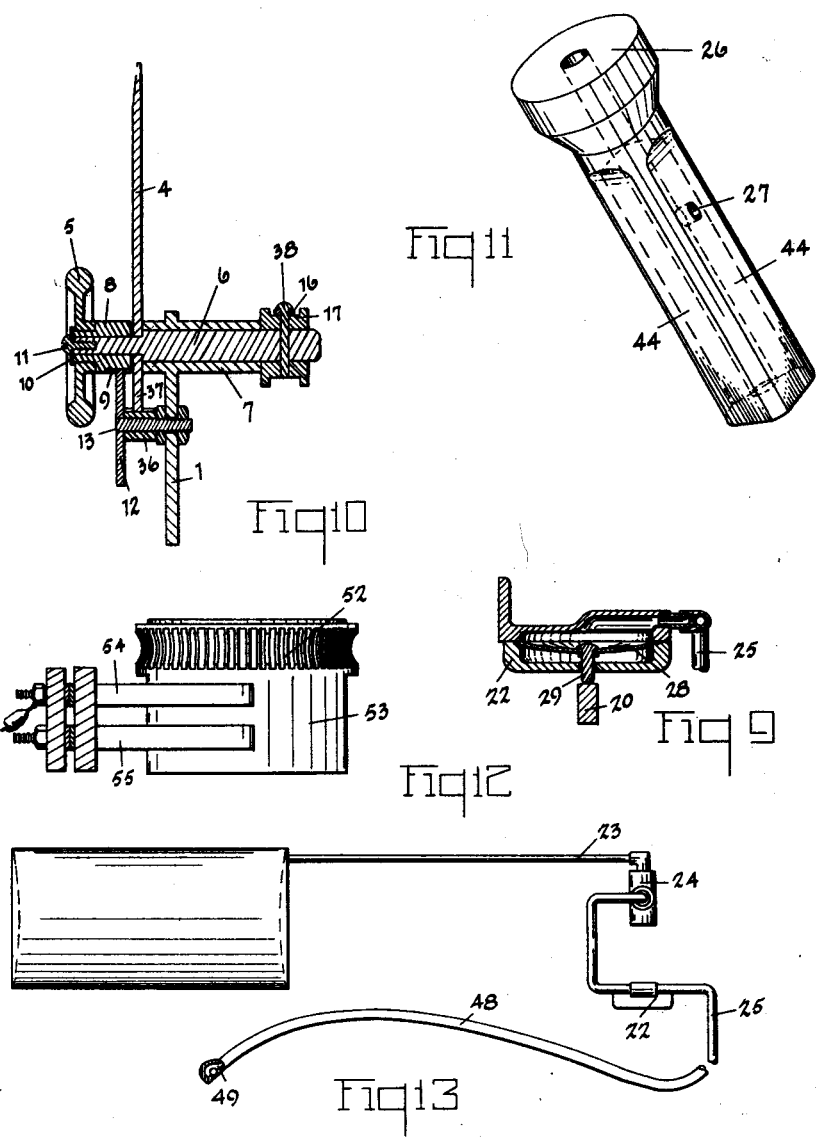
Inventor
Frank C. Fisher Patented July 9, 1929.

1,719,836

UNITED STATES PATENT OFFICE.

FRANK C. FISHER, OF TOLEDO, OHIO.

AIR-DISPENSING DEVICE.

Application filed July 16, 1927. Serial No. 206,165.

My invention has for its object to provide a control mechanism for air dispensing devices of the type commonly used for filling automobile and truck tires that is efficient and durable and will operate with certainty under all pressure conditions that are desired to be produced or obtained in the receptacles or tires that are to be filled with air. The invention also provides a means for producing a substantially direct connection between the source of supply of air with the receptacle or tire or other air container where the desired pressure is relatively high which ordinarily requires a considerable period of time to allow for the movements of the air through the control apparatus, which is designed for the more commonly used air pressures, as, for example, where it is desired to fill truck tires which carry, as a rule, very much higher pressures than are carried in the ordinary automobile tire.

The invention also has for its object to provide other features and advantages which will appear upon examination of the drawings forming a part hereof and from the description hereinafter appended.

The invention may be contained in air dispensing devices which vary in their details of construction and, to illustrate a practical application of the invention, I have selected a device as an example of the various structures that embody my invention and shall describe the particular dispensing device selected hereinafter. The dispensing device referred to is shown in the accompanying drawings.

Fig. 1 is a view of a vertical section through the head of the dispensing device and shows a front view of the controlling mechanism. Fig. 2 illustrates an end view of the control mechanism of the air dispensing device shown in Fig. 1. Fig. 3 is a view of a section of the control valve. Fig. 4 is a view of a section taken on the plane of the line 4—4 indicated in Fig. 3. Fig. 5 is a rear view of the control mechanism. Fig. 6 is a view of the other end of the control mechanism shown in Figs. 1 and 5. Fig. 7 is a view of parts of the control mechanism and illustrates the positions of the said parts when operating to maintain the control valve open to establish a substantially direct connection between the source of supply and the receptacle that is to be rapidly charged or filled with air. Fig. 8 is a view of a section of a rotary contact. Fig. 9 is a view of a section taken on the plane of the line 9—9 as indicated in Fig. 5. Fig. 10 is a view of a section taken on the plane of the line 10—10 indicated in Fig. 1. Fig. 11 is an enlarged perspective view of the control valve stem. Fig. 12 is a top view of the rotary contact. Fig. 13 is a diagrammatic view of the complete air line.

The operative members of the mechanism are supported on or secured to a suitable plate, such as, the plate 1, which may be located on and secured to a wall of the head 2 of the dispensing device. An indicator dial 3 may be secured by any suitable means in the head 2 and a pointer 4 is supported for angular movements over the dial. An adjusting mechanism is connected to the pointer 4 for setting the dispensing apparatus so that it will deliver air into a container, such as, a tire, and produce a desired pressure therein as determined by the position in which the pointer is located as indicated or measured by its position with reference to the dial 3.

To locate the pointer 4 and to adjust the control mechanism, a small hand wheel or knob 5 is mechanically connected to the pointer and also to the adjusting mechanism of the dispensing device. A more accurate adjustment of the dispensing device may be obtained by so mechanically interconnecting the handle with the pointer of the control mechanism that the movement of the handle will be reduced when transmitted to the pointer and the adjusting mechanism.

In the particular form of construction shown in the drawings, the pointer 4 is pressed onto a shaft 6 and secured thereto. The shaft 6 is rotatably located in a sleeve or boss 7 formed on the plate 1. In front of the pointer 4, a sleeve 8 is rotatably supported on the shaft 6. The handle or knob 5 is then pressed onto the outer end of the sleeve 8 and the sleeve and the handwheel are held in position relative to each other by a washer 10 and a screw 11. The inner end of the sleeve 8 is provided with a pinion 9 or teeth may be formed in the outer surface of the sleeve. The pinion meshes with a gear wheel 12. The gear wheel 12 is supported on a shaft 13 to which is connected a pinion 36. The pinion 36 meshes with a sector gear 37 formed integral with the pointer 4 so that, as the handle or knob 5 is rotated by the operator in adjusting the dispensing apparatus to obtain the desired pressure in the container, such as an automobile tire, the pointer 4 will be rotated while, at the same time, the adjusting mechanism of the device will be set so as to produce the said desired pressure. The movement of the pointer and the adjusting mechanism will be very much less than the angular movement of the handle or knob 5 because of the reduction through the gear wheels 9, 12, and 36, and the sector 37.

The adjusting mechanism of the dispensing device is dependent upon the yielding resistance of a spring as a counterbalancing member to counterbalance the pressure produced in the container into which the air is to be delivered when the pressure in the container has reached the point for which the spring is adjusted. In the particular form of construction shown, the spring 15 is connected at one end to a wire or band 16 which is also connected to a drum 17, whereby rotation of the drum 17 will operate to vary the tension to which the spring 15 is subjected, the lower end of the spring 15 being connected to a pressure device which is actuated according to the pressure produced in the container that is to be charged or filled with air at the desired pressure. The drum 17 is connected to the shaft 6 by a pin 38. The pointer 4 is also connected to the shaft 6 and, consequently, rotation of the handle or knob 5 produces an angular movement of the drum 17 and of the pointer 4.

The drum 17 is pinned to the shaft 6 so that the drum 17 may be readily replaced by another drum in order to obtain the desired tension in the spring 15 when the pointer is moved angularly and to produce a tension in the spring to correspond to the different pressures as indicated by the dial 3 and the pointer 4. In view of the fact that springs vary in their resistance to distortion, although they may have dimensions that are approximately the same, the replaceability of the drum provides for ready substitution of drums of different sizes in order to produce the distortion of the spring which corresponds to the movement of the pointer and the indications on its associated dial.

The lower end of the spring 15 is connected to an eye bolt 18 which is threaded into a finger 19 that projects from a pivoted arm 20. The eye bolt 18 affords a means for adjusting the spring 15 as well as connecting the spring to the pivoted arm 20. The arm 20 is pivotally connected to a bracket 21 that is in turn connected to the supporting plate 1 of the device. The pivoted arm 20 operates to interconnect the spring 15 with a pressure means that is actuated according to the pressure of the air in the container to which the air is dispensed and so as to produce a counterbalance between the pressure and the actuation of the spring when the pressure, as determined by the adjustment of the mechanism, has been reached.

The source of supply of air under pressure is connected to the dispensing device by means of a pipe 23 which is connected to a valve casing 24. The outlet of the valve casing is through the pipe 25 which communicates with the container, such as, an automobile tire, to which the air is delivered at the desired pressure. The pipe 25 is connected to a shell 22 in which is located a diaphragm 28. The pipe 25 is connected to one side of the diaphragm and so that the pressure in the pipe 25 will be transmitted to one side of the diaphragm. The other side of the diaphragm is connected to the pivoted arm 20. In the particular form shown, a pin 29 is connected to the center of the diaphragm 28 and the other end of the pin is placed in contact with, or rests against, the pivoted arm 20. Thus the spring 15 operates to pull the arm 20 in one direction while the pressure of the air on the diaphragm is transmitted through the pin to press the pivoted arm 20 in the opposite direction. When these pressures have the inverse proportionate relation, as the distances of the points at which they are applied from the point of connection of the arm with the bracket 21, the arm 20 will be counterbalanced. When this occurs the valve contained in the casing 24 is closed to prevent further movement of the air to the automobile tire. This will be when the pressure within the automobile tire is that indicated by the location of the pointer and the corresponding adjustment of the adjusting means of the dispensing device is made.

When the pressure within the container has reached the desired point, the pipe 25 may be disconnected therefrom. The connecting means commonly used in air dispensing apparatus is provided with a valve at the point of the connection and, as is well known, there is always a certain amount of leakage through the flexible hose that is commonly used and through the valve located at its end. This would normally operate to reduce the pressure of the air in the pipe 25 which, except for my invention, would permit the spring 15 to open the valve 26 to admit an additional quantity of air into the pipe 25 and the connecting hose. This would produce a continuous pulsating operation as between the counterbalancing spring 15 and the diaphragm 28. In order to obviate this pulsating condition and maintain the pressure of the air within the pipe 25 sufficiently high to overcome the pull of the spring 15, I have provided a by-pass of very small cross-sectional area to permit a sufficient amount of air, which would be very small in quantity, to pass through the valve and thus maintain a pressure within the pipe 25 and the connecting hose the same as that produced at the source of supply which is materially greater than the proportionate pressure required to overcome the tension of the spring on the arm 20 and thus the pulsatory movements, that would otherwise be caused, are entirely obviated.

In the form of construction shown in the drawing, the shell 24 is provided with a movable valve member 26 which is seated on the collar 14 that may be located in the shell 24, or formed integral with the shell 24. The movable valve member 26 has a stem of considerable length that extends through the collar 14 and is bored to near its lower end. Thus a material amount of the pressure of the air will be exerted on the lower end of the valve to insure proper seating of the movable valve member against the collar 14. The valve stem has flattened portions 44 extending from a point below the head of the movable valve member where it seats on the collar 14 to permit movement of air through the valve when it is raised. In an upper end of one of the flattened portions of the stem, there is located a small opening 27 which communicates with the central bore of the movable valve member. This allows air to pass through the inlet of the valve casing to the outlet 45 of the valve casing and into the pipe 25 which is connected to the flexible hose 48 and connector 49. This maintains a high pressure within the pipe 25 and the flexible hose, when the valve at the end of the hose is closed, notwithstanding any light seepage that may exist in this part of the apparatus and maintains the pivoted arm 20 against any movement by the spring 15 since it is overcome by the pressure that is thus maintained on the diaphragm 28.

When the connection is established with the container, which is to be supplied with air up to a predetermined pressure, opening the valve at the end of the connector reduces the pressure in the pipe 25 to that of the pressure in the container, notwithstanding the passage-way through the by-pass 27. This opening, however, is so small that it would take a very long time to fill the container. I have provided a means, therefore, whereby the same direct connection is made with the source of supply through the pipe 23, which is so controlled that the pressure will be raised to the desired pressure sufficiently gradually so that the connection may be cut off when the desired pressure in the container has been reached. In the particular form of construction shown, a motor 30 is supported on the plate 1 and is connected with an external circuit through the wires 35 and 39. The motor operates a worm 50 which in turn operates a worm gear 52 that is connected to a pivoted arm 60. The pivoted arm 60 is provided with an adjustable screw 65 that engages a pin 64. The pin 64 is located in a threaded sleeve 46 which is adjustably located in the valve casing 24. The sleeve 46 and the pin 64 have a considerable length in order to form a substantially air tight fit without causing material resistance to movement of the pin 64 through the sleeve 46. The upper end 47 of the pin 64 is made in the form of a valve head which seats on the upper end of the sleeve 46 and prevents the escape of air about the pin 64. Also, the enlarged end portion, or valve part of the pin 64, causes the pin 64 to normally move outward and become seated against the end of the sleeve 46 by the pressure of the air within the valve casing and prevent escape of air when it is seated. When the motor 30 is operated the pivoted arm 60 is raised and lowered so that the head of the bolt 65 intermittently engages the pin 64 and thus the pin 64 is alternately raised by the operation of the arm 60 and forced downward by the pressure of the air within the valve casing 24. The upper end or valve head 47 is located in proximity to the lower end of the valve stem of the movable valve member 26 and when the pin 64 is raised, it engages the lower end of the stem of the valve member 26 and raises the valve member 26 so as to allow a free movement of the air through the spaces formed between the inside surface of the collar 14 and the flattened portions of the stem of the movable valve member, which gives quite substantially a free flow of the air through the outlet 45 of the valve casing 24 and into the pipe 25. However, this movement of the air into the pipe 25 is only intermittent since the swinging movement of the pivoted arm 60 immediately releases the pin 64 which permits the movable valve member 26 to close the connection. Thus the pressure within the container that receives the air is gradually raised and gives opportunity to the diaphragm 28 to respond to the gradual increasing pressure in the pipe 25 and enables the control of the valve member 26 through the operations of the diaphragm 28. Since the valve member 26 has a free movement that is, has no valve packing, it acts with certainty under air pressure while the valve head 47 seals the pin 64 as against the escape of air when the pin 64 is at rest. If there is any escape about the pin 64, when the pin is reciprocated, it does not affect the operation.

The motor is controlled by the pressure on the diaphragm 28 which is transmitted through the pin 29 which counteracts the pull of the spring 15 on the arm 20. The outer end of the arm 20 is provided with a movable contact 31 which is adapted to make contact with the contacts 32 and 33 and electrically connect the contacts 32 and 33 together. The contacts 32 and 33 are connected in the circuit of the motor and the circuit of the motor is closed when the arm 20 is raised. The arm is held in its raised position and so as to make contact with the contacts when the pressure on the diaphragm 28 is inversely proportional to the lengths of the arms of the lever that the pivoted arm 20 forms with reference to the tension of the spring and the pressure transmitted through the pin 29. Thus the motor will continue to rotate and the arm 60 to oscillate to alternately open and close the valve 26 until the pressure within the pipe 25 reaches that pressure which is determined by the adjustment of the spring 15 and as indicated in the adjustment by the pointer 4. By the oscillation produced by the motor in the arm 60, there is produced long periods in which the valve is open and closed, and the valve is quickly closed and opened.

In case the desired pressure should be reached while the pivoted arm 60 is in its valve opening position, and in order to insure that the arm 60 will be brought to a point such as to enable the closure of the valve, I have provided a rotatable contact member which moves with the worm gear 52, so as to maintain the circuit closed during the time that the valve member 26 is open. In the form of construction shown, the worm gear 52 is provided with a laterally extending arcuate flange 53 that forms a movable contact which is adapted to complete the circuit between the contacts 32 and 33 by making contact with the contacts 54 and 55. Since the worm gear will continue to rotate as long as the circuit is closed, the arcuate movable contact 53 will maintain the circuit closed until the arm 60, which is connected to the worm gear, has reached such a point that the pin 64 is released and the valve member 26 is closed.

If desired, an audible announcer, such as, a bell 70, may be secured to the plate 1 in order to indicate that the controlling mechanism is in operation. As the arm 60 is oscillated by the operation of the motor, the tapper 71 of the bell is lifted and strikes the bell 70.

Inasmuch as the majority of tires carry pressures below 120 pounds, the devices of the type shown in the drawings are designed for controlling the dispensing of air within such ranges of pressure, but where large tires are to be filled, and higher air pressures are to be produced in containers, means is provided for making a direct connection between the source of supply of air and the tires or containers. A means is provided for eliminating control of the mechanism to establish a substantially direct connection through the pipe 25. This is done by opening the valve member 26 and maintaining it in its open position while the air is moving to the container which is to receive the air at a high pressure. This is done by raising the arm 60 so that the head of the screw 65 will engage the pin 64 and hold the valve member 26 in its open position. This is accomplished by rotating the pointer 4 beyond the length of the scale 3 and so that the base portion 76 of the pointer will engage a lever 75 and cause it to rock. The lever 75, is connected by a rod 79 to the end of the arm 60 near its pivot point. The arm 60 has a slot 82 in which the pivot pin 83 is located and when that end of the arm 60 is raised, the head of the screw 65 engages the pin 64 to maintain the valve member 26 in its open position. The air thus passes freely through the valve casing 24 and into the container. The air will continue to flow until the pointer 4 is turned from the extreme position wherein the lever 75 is engaged. When the lever 75 is disengaged, the end of the arm 60 and its pivot point are lowered, the device is then ready for use to control the flow of air to dispense air at pressures less than this extreme limit.

I claim:

1. In an air dispensing device, a source of supply of air under pressure, a pipe line connected to the source of supply, a valve located in the said pipe line and a closure means located at the end of the pipe line, a by-pass for permitting the escape of air from one side of the valve to the other side in the pipe line, means for opening and closing the valve and operable independent of air pressure, a diaphragm actuated by the pressure of the outlet side of the valve in the pipe line for controlling the said valve opening and closing means.

2. In an air dispensing device, a source of supply of air under pressure, a pipe line connected to the source of supply, a valve located in the said pipe line and a closure means located at the end of the pipe line, a by-pass for permitting the escape of air from one side of the valve to the other side in the pipe line, means for opening and closing the valve and operable independent of air pressure, a diaphragm actuated by the pressure of the outlet side of the valve in the pipe line, a yielding member for counterbalancing the pressure on the diaphragm for cooperating with the diaphragm to control the operation of the said valve opening and closing means.

3. In an air dispensing device, a source of supply of air under pressure, a pipe line connected to the source of supply, a valve located in the said pipe line and a closure means located at the end of the pipe line, a by-pass for permitting the escape of air from one side of the valve to the other side in the pipe line, means for opening and closing the valve and operable independent of air pressure, a diaphragm actuated by the pressure of the outlet side of the valve in the pipe line, an adjustable spring counterbalancing the pressure of the air on the diaphragm and coacting with the diaphragm for controlling the operation of the valve opening and closing means.

4. In an air dispensing device, a source of supply of air under pressure, a pipe line for connecting the source of supply with a container to be filled with air, a valve located in the said pipe line, means for intermittently opening and closing the valve, a diaphragm operated by the pressure of the air on the outlet side of the valve, a spring for counterbalancing the pressure of the air on the diaphragm and coacting with the diaphragm to control the said means for opening and closing the valve, a replaceable drum connected to one end of the spring, a pointer connected to the drum, means associated with the pointer to indicate the setting of the tension of the spring and the limit of operation of the means for opening and closing of the valve.

5. In an air dispensing device, a source of supply of air under pressure, a pipe line for connecting the source of supply with a container to be filled with air, a valve located in the pipe line, a pivoted arm for opening and closing the valve, means for oscillating the arm to intermittently open and close the valve, and means for operating the arm to maintain the valve in an opened position.

6. In an air dispensing device, a source of supply of air under pressure, a pipe line for connecting the source of supply of air under pressure, a pipe line for connecting the source of supply with a container to be filled with air, a valve located in the pipe line, a pivoted arm for opening and closing the valve, an adjustable pressure means for controlling the movement of the said arm, a movable member for indicating the adjustment of the said pressure means, and means operated by the said movable member for operating the arm to maintain the valve in an open position.

7. In a pressure regulative valve located in a pipe line, a closure means located at the end of the pipe line, a by-pass for permitting escape of the air from one side of the valve to the other side of the valve, means for opening and closing the valve, a diaphragm actuated by the pressure of the outlet side of the valve in the pipe line for controlling the said valve opening and closing means.

8. In a pressure regulative valve located in a pipe line, a valve casing, a movable valve member located in the casing, the casing having a chamber located on the outlet side of the movable valve member, the stem of the movable valve member extending into the chamber, a second movable valve member located on the outlet side of the first named valve member and adapted to engage the first named valve member to open the first named valve member and means for operating the second valve member to open and close the first named valve member.

9. In a pressure regulative valve located in a pipe line, a valve casing, a movable valve member located in the casing, the casing having a chamber located on the outlet side of the movable valve member, the stem of the movable valve member extending into the chamber, a second movable valve member located on the outlet side of the first named valve member and adapted to engage the first named valve member to open the first named valve member, means for operating the second valve member to open and close the first named valve member, a by-pass extending from the inlet side of the first named valve member to the outlet side of the first named valve member.

10. In a pressure regulative valve located in a pipe line, a valve casing, a movable valve member located in the valve casing, the casing having a chamber, the stem of the movable valve member extending into the chamber, a member movable independent of the movable valve member for engaging the valve member to open and close the valve member, and the valve having a by-pass extending from the inlet side to the outlet side of the movable valve member.

In witness whereof I have hereunto signed my name to this specification.

FRANK C. FISHER.